UNITED STATES PATENT OFFICE.

HENRY SPENCER SPACKMAN, OF ARDMORE, AND ELLIS WARREN LAZELL, OF PHILADELPHIA, PENNSYLVANIA, ASSIGNORS TO HENRY S. SPACKMAN ENGINEERING COMPANY, OF PHILADELPHIA, PENNSYLVANIA, A CORPORATION OF NEW JERSEY.

CEMENTITIOUS MATERIAL AND PREPARATION THEREOF.

No. 903,018.     Specification of Letters Patent.     Patented Nov. 3, 1908.

Application filed August 29, 1908. Serial No. 450,856.

*To all whom it may concern:*

Be it known that we, HENRY S. SPACKMAN, a resident of Ardmore, Montgomery county, and State of Pennsylvania, and ELLIS W. LAZELL, a resident of the city and county of Philadelphia, State of Pennsylvania, citizens of the United States, have made certain new and useful Inventions Relating to Cementitious Materials and Preparation Thereof, of which the following is a specification.

This invention relates to cementitious, that is to say, plastic materials or compositions, comprising plasters, hydraulic and other cements and relates more particularly to highly cementitious materials and to the preparation thereof by the incorporation of separately prepared calcium aluminate or similar accelerating material with independently cementitious material, such as lime or other similar earthy alkali material or cements or mixtures comprising available lime or similar earthy alkali substance mixed or combined with cooperating silicious material, such as fine grained high silica clays or shales or with natural pozzuolanic material, such as tufa, trass, infusorial earth, gaize or with artificial pozzuloanic materials, such as ordinary blast furnace slag or specially prepared slag or silicates of calcium or other material.

Hydraulic calcium aluminate compounds may be readily prepared by calcining suitable mixtures of finely ground lime and bauxite or other alumina compounds, such as kaolin or high alumina clays, high alumina slag and so forth, the materials being preferably combined in such proportions that from one to three molecules of lime are present to one molecule of alumina, sufficient lime being of course added to combine with the silica or other acid components which may be present in connection with the aluminous material added to form the mixture. Such mixed materials may be rendered hydraulic and given a very quick initial set when ground and mixed with water by calcining or cintering them, and if desired by subsequently fusing them in some cases which seems to give a slower initial set to aluminates containing approximately equivalent proportions of lime and alumina. It is of course understood that iron or similar material may be used in some cases to replace to some extent at least the alumina in this accelerating material, and that other earthy alkali material, such as magnesia and so forth, may be substituted for part at least of the lime combined therewith, such calcium aluminates and equivalent or substitute accelerating material being designated hydraulic earthy alkali accelerating compounds of alumina-like material.

Suitable proportions of hydraulic calcium aluminate or similar accelerating material and also if desired controlling material to effect the desired quickness of set and increase of strength may be added and incorporated at any time before utilization with the independently cementitious material comprising oxids, hydrates or otherwise available lime or similarly acting earthy alkali material combining or capable of combining with hydraulic calcium aluminate and coöperating silicious material. The finely divided accelerating material may be added and incorporated by the workman before or after he gages the cementitious material, or it may be dissolved or incorporated in the gaging water; preferably however the accelerating and controlling material may be uniformly incorporated with the independently cementitious material so as to form a finely ground material convenient for transportation and utilization since it becomes immediately effective when the water is added thereto. Such aluminates, besides being hydraulic and strongly cementitious, form hydraulic cementitious materials of considerable strength when lime or equivalent cementitious earthy alkali material is incorporated therewith up to seventy per cent. or more; also many other cementitious substances may be made more quick setting, more strongly hydraulic and stronger especially at short periods by incorporating therewith suitable small proportions of hydraulic calcium aluminate or similar accelerating material. Many natural, Portland, pozzuolanic and slag cements may with advantage receive a suitable addition of this previously prepared accelerating material, from two to five per cent. being usually sufficient for such purposes to give a very considerable increase in quickness of set and strength, especially when similar proportions of available lime are added or are present. Desirable cements of this character for ordinary purposes may comprise seventy to ninety per cent. of the original cement, ten to twenty per cent. of hydrated lime or other earthy alkali material (that is, free or loosely combined lime, magnesia, baryta, strontia and other material capable of combining with coöperating silicious material and calcium aluminate accelerating material) with which three to seven per cent. of the previously prepared hydraulic calcium aluminate accelerating material and one to three per cent. of calcium sulfate controlling material have been incorporated, an initial set as quick as fifteen minutes or as slow as several hours being thus attainable as desired. The incorporation of five to ten per cent. of calcium aluminate accelerating material, and if desired, up to five or ten per cent. of hydrated lime and one to three per cent. of calcium sulfate with independently cementitious material such as the low-limed natural cements of the Lehigh district gives very good compositions and causes very considerable increases in their sand strengths, especially at early periods.

As an illustration a composition containing ninety per cent. of such natural cement giving when tested with three parts of sand about 100 pounds at seven days and about 140 pounds at twenty-eight days and having the following approximate composition with which was incorporated ten per cent. of hydraulic calcium aluminate accelerating material having the following approximate composition:

|  | Natural cement. | Accelerator. |
|---|---|---|
| $SiO_2$ | 22.82 | 1.16 |
| $R_2O_3$ | 10.76 | 66.92 |
| CaO | 48.40 | 31.46 |
| MgO | 1.52 | .72 |
| Loss on ignition | 13.72 | .02 | gave when tested in accordance with the standard methods the following results: initial set two hours and thirty minutes; final set four hours and fifty minutes; tensile strength with three parts of sand at seven days 160 pounds, and at twenty-eight days 230 pounds. Another composition made from materials of approximately the same analyses incorporated in proportions of eighty per cent. of natural cement ten per cent. of hydrated lime, seven per cent. of hydraulic calcium aluminate accelerator and three per cent. calcium sulfate gave the following tests: initial set one hour fifty-five minutes; final set four hours; tensile strength with three parts of standard sand at seven days 210 pounds and at twenty-eight days 380 pounds. Another natural cement somewhat more finely ground when ninety parts were incorporated with five parts of hydrated lime and five parts of hydraulic calcium aluminate accelerator and tested with three parts of sand gave at one day 210 pounds and at seven days 360 pounds. These compositions are also constant in volume when tested in steam and hot water, thus as indicated fulfilling the constant volume and sand strength requirements for standard Portland cement. The incorporation of a considerably larger proportion, such as ten to twenty-five per cent. or more of calcium aluminate accelerating material, for instance, to such cements containing available lime or the like or having the same added thereto produces cements having much greater strengths with sand than the original cements. Various proportions of such accelerating material may also be incorporated with mixtures of slaked lime or its equivalent and silicious clay or shale or pozzuolanic material (preferably either fine grained or finely ground so that ninety-five per cent. or so pass a sieve having a hundred meshes to the linear inch) to secure the desired quickness of set and increase of strength, the percentage to be added depending of course on the chemical composition of the ingredients used, two to ten per cent. of calcium aluminate being usually sufficient, it not having been found necessary to add much over twenty per cent. to produce cements equal in strength when used with sand to Portland cements; although considerably larger proportions of the accelerator give much greater strength to the cement at early periods, the aluminate when gaged alone or after incorporation with small proportions of lime and coöperating silicious material giving strengths considerably in excess of Portland cement. Such a composition as eighty-five per cent. of hydraulic calcium aluminate accelerator formed by calcining about two parts of lime and three parts of alumina incorporated in finely divided condition with ten per cent. of hydrate of lime and five per cent. of calcium sulfate, and compositions containing thirty-five to forty-five per cent. of such calcium aluminate accelerator and forty-five to fifty-five per cent. or so of Portland or natural cement, for example, seven per cent. of hydrate of lime and three per cent. of calcium sulfate show very great strengths especially at short periods. A good illustrative composition for use as ordinary hydraulic cement may be secured by mixing approximately forty-five parts of hydrated lime, forty-five parts of natural shale or clay or of pozzuolanic material, and ten parts of the calcium aluminate material, from one to three per cent. of plaster of paris being added to this mixture to control the rate of setting. The proportions of materials may be varied within a wide range without effecting materially the results and are subject to some modification for each special material. Good hydraulic compositions can be obtained in some cases with a lime content as high as about eighty per cent.

or containing as low as about fifteen per cent. or even less of free or available lime when the silica is largely or wholly present as silicates in soluble form that is soluble in hydrochloric acid or sodium carbonate.

An illustrative composition suitable for general use as a hydraulic cement may be prepared by incorporating forty-five parts of slaked lime having approximately the following analysis:

| | |
|---|---|
| Silica ($SiO_2$) | 1.02% |
| Alumina and iron oxid ($R_2O_3$) | .42% |
| Calcium hydrate ($Ca(OH)_2$) | 96.87% | forty-five parts of clay having the following approximate analysis:

| | |
|---|---|
| Silica ($SiO_2$) | 69.02% |
| Alumina ($Al_2O_3$) | 5.31% |
| Iron oxid ($Fe_2O_3$) | 2.35% |
| Lime (CaO) | 6.22% |
| Magnesia (MgO) | 3.12% |
| Loss on ignition | 11.96% | seven parts of hydraulic calcium aluminate accelerating material and three parts of plaster of paris. This material when the components were thoroughly incorporated by being ground together so that ninety-five per cent. passed through a 100-mesh sieve had, when gaged with water, an initial setting time of about two hours and was completely set in about four hours according to the indications of the standard Vicat needle. A sample of this hydraulic highly cementitious material, when tested at the twenty-eight day period in the ordinary way with three parts of commercial sand in water gave tensile strengths equal to those obtained from Portland cements, and the material passed the standard soundness or constancy of volume test in boiling water specified for Portland cement, indicating that it has cementitious properties similar to Portland cement.

Suitable pozzuolanic material such as volcanic earths, tufa, slag and so forth are particularly adapted to the making of cement by this process. Many such materials when mixed with lime or other earthy alkali material and incorporated with from five to ten per cent. of calcium aluminate as indicated, develop their set in a few hours and show tensile strengths when tested with sand equal to those obtained from Portland cements at seven and twenty-eight days and longer periods; thus they are radically different from the well known pozzuolanic cements formed by the addition of lime alone to such material and being so undesirable because of their slow setting, poor sand carrying and other objectionable properties.

Other cementitious or plastic materials may be formed by the incorporation of a comparatively small proportion of calcium aluminate accelerating material with a large proportion of lime or similar alkali material, these compositions being especially desirable for use as wall plaster or for similar purposes, and since for these purposes the material can harden in air its hydraulic properties are comparatively unimportant. A good composition for use as commercial wall plaster may be secured by adding such an amount of the accelerator as to have from one to ten per cent. of alumina present, according to the quickness of set desired, the materials being also in this case preferably incorporated by thoroughly grinding them together. The hardness and strength of plastic, that is to say, cementitious material of this character can apparently be increased by the incorporation of a suitable proportion of silicic or pozzuolanic material, from one to about ten per cent. for instance, and it is of course also desirable to add from one to five per cent. of plaster of paris, gypsum, glue, starch, molasses, or other controlling material to regulate the setting time.

A desirable composition for general use as wall plaster may be prepared by incorporating eighty-six parts of dry hydrated lime, ten parts of calcium aluminate accelerating material containing approximately forty per cent. of alumina, two parts of plaster of paris and two parts of infusorial earth. This material when the components are thoroughly incorporated and finely ground together so that ninety-five per cent. pass through a 100-mesh sieve has an initial setting time of about four hours and is completely set in about fifteen hours according to the standard Vicat needle test. A sample of this highly cementitious material when tested in the ordinary way with three parts of commercial sand in air gives the following high tensile strengths: at seven days 125 pounds per square inch and at twenty-eight days 151 pounds per square inch. A plaster composition having less tensile strength and therefore being more desirable as a general wall finish in building operations may be similarly prepared by incorporating eighty-eight parts of dry hydrated lime, seven parts of hydraulic calcium aluminate accelerating material containing approximately forty per cent. of alumina, three parts of plaster of Paris and two parts of basic blast furnace slag. This plaster material when tested in the ordinary way with three parts of commercial sand in air gives about fifty pounds tensile strength per square inch at seven days and about ninety pounds at twenty-eight days. When used as a plaster as much as five parts of commercial sand can be readily incorporated therewith and give the desired spreading qualities for wall finishing, the plaster hardening completely so as to allow the application of a finishing coat in about twelve hours.

Having described the invention in this case which is a continuation of, that is, contains subject-matter taken from United States patent application, 394,916, filed September 27, 1907, in connection with a number of illustrative ingredients, proportions, formulas and methods of preparation, to the details of which disclosure the invention is not of course to be limited, what is claimed as new and what is desired to be secured by Letters Patent is set forth in the appended claims.

1. The hydraulic highly cementitious material fulfilling the constant volume requirements for standard Portland cement and having considerably greater strength at early periods than standard Portland cement comprising available lime and up to about fifty per cent. of separately prepared hydraulic calcium aluminate accelerating material with which controlling material and hydraulic independently cementitious material are incorporated.

2. The hydraulic highly cementitious material fulfilling the constant volume requirements for standard Portland cement and having considerably greater strength at early periods than standard Portland cement comprising available earthy alkali material and up to about fifty per cent. of separately prepared hydraulic earthy alkali accelerating compounds rich in alumina-like material with which controlling material and hydraulic independently cementitious material are incorporated.

3. The highly cementitious material fulfilling the constant volume requirements for standard Portland cement and having considerably greater sand strength at early periods than standard Portland cement comprising available lime and considerable proportions of separately prepared hydraulic calcium aluminate accelerating material with which controlling material and independently cementitious material are incorporated.

4. The highly cementitious material having considerably greater sand strength at early periods than standard Portland cement comprising available earthy alkali material and considerable proportions of separately prepared hydraulic earthy alkali accelerating compounds rich in alumina-like material with which coöperating cementitious material and controlling material are incorporated.

5. The highly cementitious material having considerably greater sand strength at early periods than standard Portland cement comprising considerable proportions of prepared hydraulic earthy alkali accelerating compounds rich in alumina-like material with which coöperating cementitious material is incorporated.

6. The highly cementitious material having considerably greater strength at early periods than standard Portland cement comprising considerable proportions of hydraulic calcium aluminate material with which coöperating cementitious material is incorporated.

7. The highly cementitious material having considerably greater strength at early periods than standard Portland cement comprising up to about fifty per cent. of separately prepared hydraulic earthy alkali accelerating compounds rich in alumina-like material with which coöperating cementitious material is incorporated.

8. The hydraulic highly cementitious material fulfilling the constant volume and sand strength requirements for standard Portland cement comprising considerable proportions of lime and coöperating silicious material and comprising a small percentage of incorporated separately prepared hydraulic calcium aluminate accelerating material and calcium sulfate controlling material.

9. The highly cementitious material fulfilling the constant volume and sand strength requirements for standard Portland cement comprising large proportions of earthy alkali material and coöperating silicious material and comprising a small percentage of incorporated hydraulic calcium aluminate accelerating material and controlling material.

10. The hydraulic highly cementitious material fulfilling the constant volume and sand strength requirements for Portland cement comprising large proportions of lime and coöperating silicious material and comprising a small proportion of incorporated separately prepared hydraulic calcium aluminate accelerating material.

11. The hydraulic highly cementitious material fulfilling the constant volume and sand strength requirements for Portland cement comprising considerable proportions of earthy alkali material and coöperating silicious material and comprising a small percentage of incorporated separately prepared calcium aluminate accelerating material.

12. The hydraulic highly cementitious material fulfilling the constant volume and sand strength requirements for Portland cement comprising large proportions of lime and coöperating silicious material and comprising a small percentage of incorporated separately prepared hydraulic earthy alkali accelerating compound of alumina-like material and controlling material.

13. The hydraulic highly cementitious material fulfilling the constant volume and sand strength requirements for Portland cement comprising considerable proportions of earthy alkali material and coöperating silicious material and comprising a small percentage of separately prepared hydraulic earthy alkali accelerating compounds of alumina-like material and controlling material.

14. The hydraulic highly cementitious material fulfilling the constant volume and sand strength requirements for Portland cement comprising large proportions of lime and coöperating silicious material and comprising a small percentage of incorporated separately prepared hydraulic earthy alkali accelerating compounds of alumina-like material.

15. The hydraulic highly cementitious material fulfilling the constant volume and sand strength requirements for Portland cement comprising considerable proportions of earthy alkali material and coöperating silicious material and comprising a small percentage of separately prepared hydraulic earthy alkali accelerating compounds of alumina-like material.

16. The hydraulic highly cementitious material fulfilling the constant volume and strength requirements for standard Portland cement comprising a large proportion of hydraulic independently cementitious material and comprising a small percentage of incorporated separately prepared calcium aluminate accelerating material and controlling material.

17. The hydraulic highly cementitious material fulfilling the constant volume and sand strength requirements for standard Portland cement comprising a large proportion of hydraulic independently cementitious material and comprising a small proportion of available lime and of separately prepared calcium aluminate accelerating material.

18. The hydraulic highly cementitious material fulfilling the constant volume and strength requirements for standard Portland cement comprising a large proportion of hydraulic independently cementitious material and comprising a small proportion of incorporated separately prepared hydraulic earthy alkali accelerating compounds rich in alumina-like material and of controlling material.

19. The hydraulic highly cementitious material fulfilling the constant volume and strength requirements for standard Portland cement comprising a large proportion of hydraulic independently cementitious material and comprising a small proportion of incorporated separately prepared hydraulic earthy alkali accelerating compounds rich in alumina-like material.

20. The hydraulic highly cementitious material comprising a large proportion of independently cementitious material comprising lime with which a small proportion of separately prepared hydraulic calcium aluminate accelerating material is incorporated to increase the quickness of set and early tensile strength of the material.

21. The hydraulic highly cementitious material comprising independently cementitious material with which separately prepared hydraulic calcium aluminate accelerating material is incorporated to increase the quickness of set and early tensile strength of the material.

22. The highly cementitious material comprising a large proportion of independently cementitious material comprising lime with which a small proportion of separately prepared hydraulic earthy alkali accelerating compounds rich in alumina-like material is incorporated to increase the quickness of set of the material.

23. The highly cementitious material comprising independently cementitious material comprising earthy alkali material with which a small proportion of separately prepared hydraulic earthy alkali accelerating compounds rich in alumina-like material is incorporated to increase the quickness of set of the material.

24. The hydraulic highly cementitious material comprising a large proportion of earthy alkali material and comprising incorporated separately prepared hydraulic calcium aluminate accelerating material to increase the quickness of set and early tensile strength of the material.

25. The hydraulic highly cementitious material comprising a large proportion of earthy alkali material and comprising incorporated separately prepared hydraulic earthy alkali accelerating compounds rich in alumina-like material to increase the quickness of set and early tensile strength of the material.

26. The process of preparing highly cementitious material which consists in calcining calcium alumina compounds to form hydraulic calcium aluminate accelerating material and in incorporating a considerable proportion thereof with independently cementitious material comprising available lime to produce hydraulic highly cementitious material having strengths considerably in excess of Portland cement at early periods.

27. The process of preparing highly cementitious material which consists in incorporating considerable proportions of separately prepared hydraulic calcium aluminate accelerating material with hydraulic independently cementitious material to produce hydraulic highly cementitious material having strengths considerably in excess of Portland cement at early periods.

28. The process of preparing highly cementitious material which consists in incorporating separately prepared calcium aluminate accelerating material with independently cementitious material comprising available earthy alkali material to produce highly cementitious material having considerably greater sand strengths at early periods than standard Portland cement.

29. The process of preparing highly cementitious material which consists in incorporating considerable proportions of separately prepared hydraulic earthy alkali accelerating compounds rich in alumina-like material with coöperating cementitious material to produce cementitious material having considerably greater sand strengths at early periods than standard Portland cement.

30. The process of preparing highly cementitious material which consists in incorporating separately prepared calcium aluminate accelerating material with independently cementitious material comprising available lime to increase the quickness of set and early strength of the material.

31. The process of preparing highly cementitious material which consists in incorporating separately prepared calcium aluminate accelerating material and controlling material with independently cementitious material comprising lime and coöperating silicious material.

32. The process of preparing highly cementitious material which consists in incorporating separately prepared hydraulic calcium aluminate accelerating material and calcium sulfate controlling material with independently cementitious material comprising lime.

33. The process of preparing highly cementitious material which consists in incorporating separately prepared hydraulic earthy alkali compounds rich in alumina-like material and controlling material with independently cementitious material comprising earthy alkali material.

34. The process of preparing cementitious material which consists in incorporating separately prepared calcium aluminate accelerating material and controlling material with independently cementitious material comprising available lime.

35. The process of preparing cementitious material which consists in incorporating separately prepared hydraulic calcium aluminate accelerating material with independently cementitious material comprising hydrated lime to increase the quickness of set and early strength of the material.

36. The process of preparing cementitious material which consists in incorporating at least a small proportion of separately prepared hydraulic calcium aluminate accelerating material and calcium sulfate controlling material with independently cementitious material comprising hydrated lime to increase the quickness of set, early strength and spreading properties of the material.

37. The regulating material for use with cementitious material comprising lime which consists of hydraulic calcium aluminate accelerating material and incorporated calcium sulfate controlling material.

38. The regulating material for use with cementitious material comprising earthy alkali material which comprises hydraulic calcium aluminate accelerating material and incorporated controlling material.

39. The regulating material for use with cementitious material comprising earthy alkali material which comprises hydraulic earthy alkali accelerating compounds rich in alumina-like material and incorporated calcium sulfate controlling material.

40. The regulating compound for use with cementitious material comprising earthy alkali material which consists of hydraulic earthy alkali accelerating compounds of alumina like material and incorporated controlling material.

41. The process of preparing highly cementitious material which consists in incorporating separately prepared calcium aluminate accelerating material with hydraulic independently cementitious material comprising available lime to increase the quickness of set and early strength of the material.

42. The process of preparing highly cementitious material which consists in incorporating separately prepared earthy alkali accelerating compounds rich in alumina-like material with hydraulic independently cementitious material comprising lime and coöperating silicious material.

43. The process of preparing highly cementitious material which consists in incorporating separately prepared hydraulic earthy alkali compounds rich in alumina-like material and controlling material with hydraulic independently cementitious material comprising earthy alkali material.

HENRY SPENCER SPACKMAN.
ELLIS WARNER LAZELL.

Witnesses:
Louis F. Schuck,
W. L. Wilson.